US012308526B2

(12) United States Patent
Wallén et al.

(10) Patent No.: US 12,308,526 B2
(45) Date of Patent: May 20, 2025

(54) ARRAY ANTENNA

(71) Applicant: SAAB AB, Linköping (SE)

(72) Inventors: Max Wallén, Mölnlycke (SE); Bengt Svensson, Mölndal (SE); Mussie Gebretnsae, Gothenburg (SE)

(73) Assignee: SAAB AB, Linköping (SE)

(*) Notice: Subject to any disclaimer, the term of this patent is extended or adjusted under 35 U.S.C. 154(b) by 160 days.

(21) Appl. No.: 17/796,905

(22) PCT Filed: Feb. 5, 2020

(86) PCT No.: PCT/SE2020/050109
§ 371 (c)(1),
(2) Date: Aug. 2, 2022

(87) PCT Pub. No.: WO2021/158150
PCT Pub. Date: Aug. 12, 2021

(65) Prior Publication Data
US 2023/0056876 A1 Feb. 23, 2023

(51) Int. Cl.
*H01Q 21/00* (2006.01)
*H01Q 1/12* (2006.01)
*H01Q 1/52* (2006.01)

(52) U.S. Cl.
CPC ........... *H01Q 21/0087* (2013.01); *H01Q 1/12* (2013.01); *H01Q 1/523* (2013.01)

(58) Field of Classification Search
USPC .......................................................... 343/702
See application file for complete search history.

(56) References Cited

U.S. PATENT DOCUMENTS 10,230,172 B1 * 3/2019 Wolf .................... H01Q 21/064
2002/0109633 A1 * 8/2002 Ow ...................... H01Q 9/0407
343/700 MS (Continued)

FOREIGN PATENT DOCUMENTS

EP 1480289 A1 * 11/2004 ............. H01Q 1/526
EP 2642587 A1 * 9/2013 ............. H01Q 21/00

(Continued)

OTHER PUBLICATIONS

Extended European Search Report mailed Sep. 25, 2023 for European Patent Application No. 20917567.8, 8 pages.

(Continued)

*Primary Examiner* — Hoang V Nguyen
*Assistant Examiner* — Brandon Sean Woods
(74) *Attorney, Agent, or Firm* — Sage Patent Group

(57) ABSTRACT

The present disclosure relates to an array antenna extending along a first axis in a first direction in a first plane and a second axis in a second direction in the first plane, the first direction being perpendicular to the second direction, the array antenna including; a substrate having a first side and an opposing second side; a plurality of connectors extending in a third direction from the first side, the third direction being perpendicular to the first plane; an antenna element module having a radiating side and an opposing coupling side, wherein the antenna element module includes a plurality of antenna elements arranged on the radiating side and an electromagnetic shielding structure arranged on the coupling side.

15 Claims, 8 Drawing Sheets

(56) References Cited

U.S. PATENT DOCUMENTS

| | | | | |
|---|---|---|---|---|
| 2012/0068906 A1* | 3/2012 | Asher | H01Q 21/0025 343/853 |
| 2015/0097737 A1* | 4/2015 | Vemagiri | H01Q 1/50 343/702 |
| 2015/0263421 A1* | 9/2015 | Chiu | H01L 23/66 29/601 |
| 2019/0123443 A1* | 4/2019 | Russell | H01Q 1/22 |
| 2019/0191597 A1* | 6/2019 | Han | H05K 1/111 |

FOREIGN PATENT DOCUMENTS

| | | | |
|---|---|---|---|
| WO | WO-03103361 A1 * | 12/2003 | H01Q 1/243 |
| WO | 2010/116357 A1 | 10/2010 | |

OTHER PUBLICATIONS

International Search Report and Written Opinion mailed Oct. 21, 2020 for International Application No. PCT/SE2020/050109, 15 pages.

* cited by examiner

ARRAY ANTENNA

CROSS-REFERENCE TO RELATED APPLICATIONS

This application is a 35 U.S.C § 371 national stage application for International Application No. PCT/SE2020/050109, entitled "AN ARRAY ANTENNA", filed on Feb. 5, 2020, the disclosures and contents of which are hereby incorporated by reference in their entireties.

TECHNICAL FIELD

The present disclosure relates to an array antenna and a method for manufacturing the same.

INTRODUCTION

Antennas are known in the art and used to convert radio frequency fields into alternating current or converting alternating current in to radio frequency. Antenna arrays with a set of two or more antenna elements are commonly used in various applications to combine or process signals from the antenna array in order to achieve improved performance over that of a single antenna. For instance they are able to match a radiation pattern to a desired coverage area, changing radiation pattern, adapting to changing signal conditions and some configurations can cover a large bandwidth. Array antennas can be described by their radiation patterns and by the type of antenna elements in the system. Array antennas can be built by a plurality of antenna element modules, connected to each other.

Traditionally the antenna element modules in an array antenna have been separated from the active circuits through connector interfaces. Furthermore a separation is needed between the connector interfaces to allow for mechanical misalignments between the two.

Furthermore electromagnetic shielding devices are needed to enclose the active components and to avoid leakage to and from the circuits.

Due to the size of components cooling devices and electromagnetic shielding, a way of manufacture an array antenna is to arrange circuit boards in a plane perpendicular to the antenna element modules. This allows for the circuit boards and its components to fit behind the antenna module.

If the array antenna is arranged according to a tile module, where the circuit board is arranged parallel to the antenna element module, the available area for the components for each antenna element will be restricted by the antenna element spacing. There currently exist tile-modules of different types. However, these tile-modules require a costly manufacturing and comprise of many sub-parts.

Finding a cost-effective and easy way of building tile-modules is therefore of great interest. Especially important are means of providing tile modules being cheap, having an efficient arrangement with few parts and tile-modules that are convenient to manufacture.

There is room in the present art to explore the domain of providing an array antenna with simplicity in design and manufacturing, compared to previous solutions. There is specifically a need in the present art for improved array antennas being efficiently arranged, and having a simplified and cheap manufacturing.

SUMMARY

It is therefore an object of the present invention to provide an array antenna and a method for manufacturing an array antenna to mitigate, alleviate or eliminate one or more of the above-identified deficiencies and disadvantages.

This object is achieved by means of providing an array antenna as defined in the appended claims.

The present disclosure is at least partly based on the insight that by providing an antenna structure in the form of an integrated tile module where the antenna elements are made in one piece together with the needed electromagnetic shielding structure several advantages in terms of cost effectiveness, manufacturing and assembly are readily available. In accordance with the invention there is provided an array antenna according to claim 1 and a method for manufacturing an array antenna according to claim 13.

The present disclosure provides an array antenna extending along a first axis extending in a first direction in a first plane and a second axis extending in a second direction in the first plane, the first direction being perpendicular to the second direction, the array antenna comprising; a substrate having a first side and an opposing second side; a plurality of connectors extending in a third direction from the first side, the third direction being perpendicular to the first plane; an antenna element module having a radiating side and an opposing coupling side, wherein the antenna element module comprises a plurality of antenna elements arranged on the radiating side and an electromagnetic shielding structure arranged on the coupling side; the electromagnetic shielding structure having a connecting portion arranged to be mounted to the first side of the substrate; wherein said substrate is arranged to be coupled to the antenna element module such that the first side of the substrate faces said coupling side of the antenna element module and such that each connector is coupled to a corresponding antenna element of the plurality of antenna elements, wherein said connecting portion of said electromagnetic shielding structure is joined to said first side.

A benefit of the array antenna is that the electromagnetic shielding structure extends from the antenna element module, in other words, the electromagnetic shielding structure is integrated in the antenna element module. The integration of the electromagnetic shielding structure in the antenna element module allows for a faster manufacturing process of the array antenna. Further, the electromagnetic shielding structure according to the present disclosure allows for shielding of a plurality of components. Thus, the electromagnetic shielding structure allows for electromagnetic isolation between different components placed on the first side of the substrate.

Another benefit of having the electromagnetic shielding structure integrated in the antenna module that is coupled to a substrate is that electrical components can be placed on the first side of the substrate in a flexible manner compared to other solutions. By having the electromagnetic shielding structure integrated in the antenna module several extra components may be avoided when assembling the array antenna. Thus, the components placed upon the first side of the substrate may be placed more freely without having to pay regard for how it should coexist with any extra components for the shielding. Furthermore, the substrate may be adapted to match the configuration of the antenna element module or the antenna element module may be adapted to match the components placed on the substrate.

The electromagnetic shielding structure may extend from the coupling side in a direction opposite to the third direction, wherein the electromagnetic shielding structure comprises a plurality of chambers, each chamber being defined by an inner shielding surface, enclosing each chamber in the first and the second direction.

A benefit of having an electromagnetic shielding structure that comprises a plurality of chambers is that each chamber may be adapted for shielding of one specific component. Thus, by providing an electromagnetic shielding structure with a plurality of chambers defined by an inner shielding surface, a plurality of components may be shielded from each other. This allows for electromagnetic compatibility which is the ability of components on the array antenna to operate within its electromagnetic environment, thus avoiding electromagnetic interference between components.

According to some embodiments, the electromagnetic shielding structure further comprises a plurality of connector enclosures extending in the third direction, each connector enclosure being defined by an inner enclosure surface, wherein the inner enclosure surface of each connector enclosure extends in the third direction through the coupling surface, forming a passage to a radiating section.

Thus, the plurality of chambers fully shields electrical components from other components and the plurality of connector enclosures allows for a connector to extend to a radiating section to feed the antenna element while being shielded. The radiating section may extend between the radiating side and the coupling side of the antenna element module.

The substrate may further comprise at least one electrical component on the first side, and wherein each electrical component is enclosed by a corresponding one of said plurality of chambers.

Each connector may be enclosed by a corresponding one of said plurality of connector enclosures.

According to some embodiments, at least a part of the electromagnetic shielding structure forms a continuous structure.

A continuous structure forming the electromagnetic shielding structure allows for a simple manufacturing and a larger variety of manufacturing options for the electromagnetic shielding structure. Further, it allows for less material waste.

Each of said connectors and/or electrical components may be galvanically isolated from the electromagnetic shielding structure. The connectors may each have a surrounding insulating layer such as a dielectric layer that further allows for stability for the connector in the electromagnetic shielding structure; or the inner enclosure surface of the electromagnetic shielding structure may be covered/coated with an insulating/dielectric layer allowing for galvanic isolation even in a situation where a connector may lean towards the inner enclosure surface.

The antenna elements may be slot antenna elements, notch antenna elements, dipole antenna elements or any other suitable antenna element. The array antenna according to the present disclosure may comprise any suitable type of antenna element.

The plurality of chambers may comprise a tubular and/or any polygonal form extending in a direction perpendicular to the first plane. Further, the plurality of connector enclosures may comprise a tubular and/or polygonal form extending in a direction perpendicular to the first plane. The form of each of the plurality of chambers and connector enclosures may be adapted to the dimensions of the component/connector that the chamber/connector enclosure is adapted to shield.

According to some embodiments, there is a distance between the first side of the substrate and the coupling side of the antenna element module in the third direction.

The connecting portion of the electromagnetic shielding structure may be joined to the first side of the substrate by means of adhesive, welding, soldering, pressure or any other suitable method. Thus, the electromagnetic shielding structure is configured to be aligned to the first side of the substrate by any suitable means.

There is further provided a method for manufacturing an antenna array extending along a first axis extending in a first direction in a first plane and a second axis extending in a second direction in the first plane, the method comprising; providing a substrate having a first side and a second side; forming an antenna element module having a radiating side and an opposing coupling side, the antenna element module comprising a plurality of antenna elements, and an electromagnetic shielding structure having a connecting portion, wherein the plurality of antenna elements are arranged on the radiating side and the electromagnetic shielding structure arranged on the coupling side of said antenna element module; assembling a connector on said first side of said substrate, said connector extending in a third direction being perpendicular to the first plane; mounting the connecting portion of the electromagnetic shielding structure to said first side of said substrate.

A benefit of the method is that it allows for a faster manufacturing compared to other methods, by having the electromagnetic shielding structure integrated in the antenna element module.

The method may further comprise the step of, preceding the step of mounting the connecting portion of the electromagnetic shielding structure to said first side of said substrate; mounting at least one electrical component on the first side of said substrate; wherein the electromagnetic shielding structure comprises a plurality of chambers (12), and a plurality of connector enclosures (12'), wherein the step of mounting the connecting portion (7) of the electromagnetic shielding structure (6) to said first side (8) of said substrate (2) is performed such that each electrical component (14) is enclosed by a corresponding one of said plurality of chambers (12) and each connector (3) is enclosed by a corresponding one of said plurality of connector enclosures (12').

The antenna element module may be formed by additive manufacturing or milling.

Further, a vehicle may comprise the array antenna according to the present disclosure.

Furthermore, a base station may comprise the array antenna according to the present disclosure.

DETAILED DESCRIPTION

Figure 1:
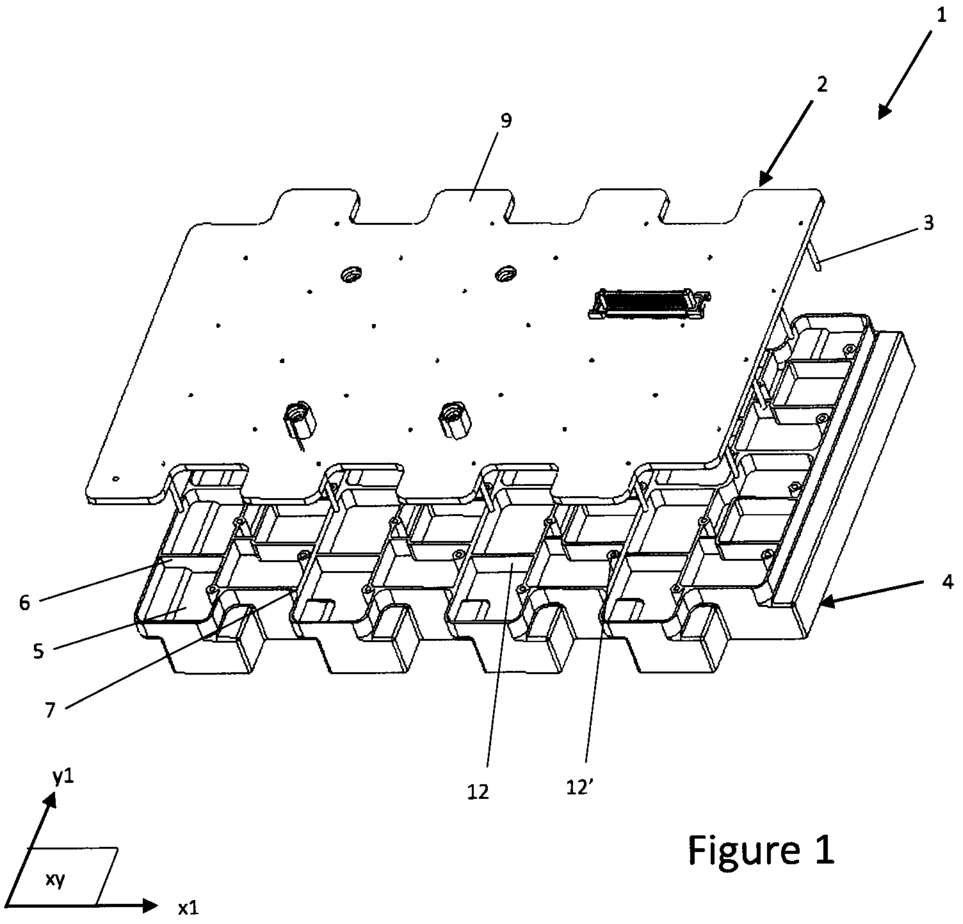
FIG. 1 Depicts an isometric view of an exploded array antenna

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided array antenna and method for manufacturing the same, it will be apparent to one skilled in the art that the device and method may be realized without these details. In other instances, well known constructions or functions are not described in detail, so as not to obscure the present disclosure.

In the following description of example embodiments, the same reference numerals denote the same or similar components.

The term "array antenna" or "array of antenna elements" or "antenna element array" refers to a set of multiple connected antennas which work together as a single antenna. In this disclosure the term "antenna array" refers to at least two antenna elements. The term "RF" refers to radio frequency which is an electromagnetic wave having a frequency. An antenna array may be coupled to a feeding system.

The term "electromagnetic shielding" or "EM shielding" refers to surrounding electrical components and cables with conductive or magnetic materials to isolate the electrical components and cables from the surroundings. The shielding can reduce the coupling of radio waves, electromagnetic fields and electrostatic fields.

The term "connector" may for example be a coaxial cable, coaxial pin or a coaxial probe which transmits radio frequency signals between at least two points.

The term "radiating section" refers to a cavity within the antenna element module that guides electromagnetic waves from the connector to be emitted from the antenna element. The cavity may be filled with air or dielectric material.

FIG. 1 illustrates the array antenna from an exploded isometric viewed from the second side of the substrate. FIG. 1 illustrates an array antenna 1 extending along a first axis x1 extending in a first direction in a first plane xy and a second axis y1 extending in a second direction in the first plane xy, the first direction x1 being perpendicular to the second direction y1. The array antenna 1 comprising; a substrate 2 having a first side 8 and an opposing second side 9 (see FIG. 6). A plurality of connectors 3 extending in a third direction from the first side 8, the third direction being perpendicular to the first plane xy; an antenna element module 4 having a radiating side 10 and an opposing coupling side 5. The antenna element module 4 further comprises a plurality of antenna elements 11 arranged on the radiating side 10 and an electromagnetic shielding structure 6 arranged on the coupling side 5; the electromagnetic shielding structure 6 having a connecting portion 7 arranged to be mounted to the first side 8 (see FIG. 2) of the substrate 2; said substrate 2 is arranged to be coupled to the antenna element module 4 such that the first side of the substrate 2 faces said coupling side 5 of the antenna element module 4 and such that each connector 3 is coupled to a corresponding antenna element of the plurality of antenna elements 11, wherein said connecting portion 7 of said electromagnetic shielding structure 6 is joined to said first side 8.

As illustrated in FIG. 1, the substrate 2 and the antenna element module 4 are adapted to be coupled to each other, thus the antenna element module 4 and the substrate 2 may have the same form. Further, the first side 8 of the substrate 2 and the coupling side 5 of the antenna element module 4 are parallel to each other when coupled.

Figure 2:
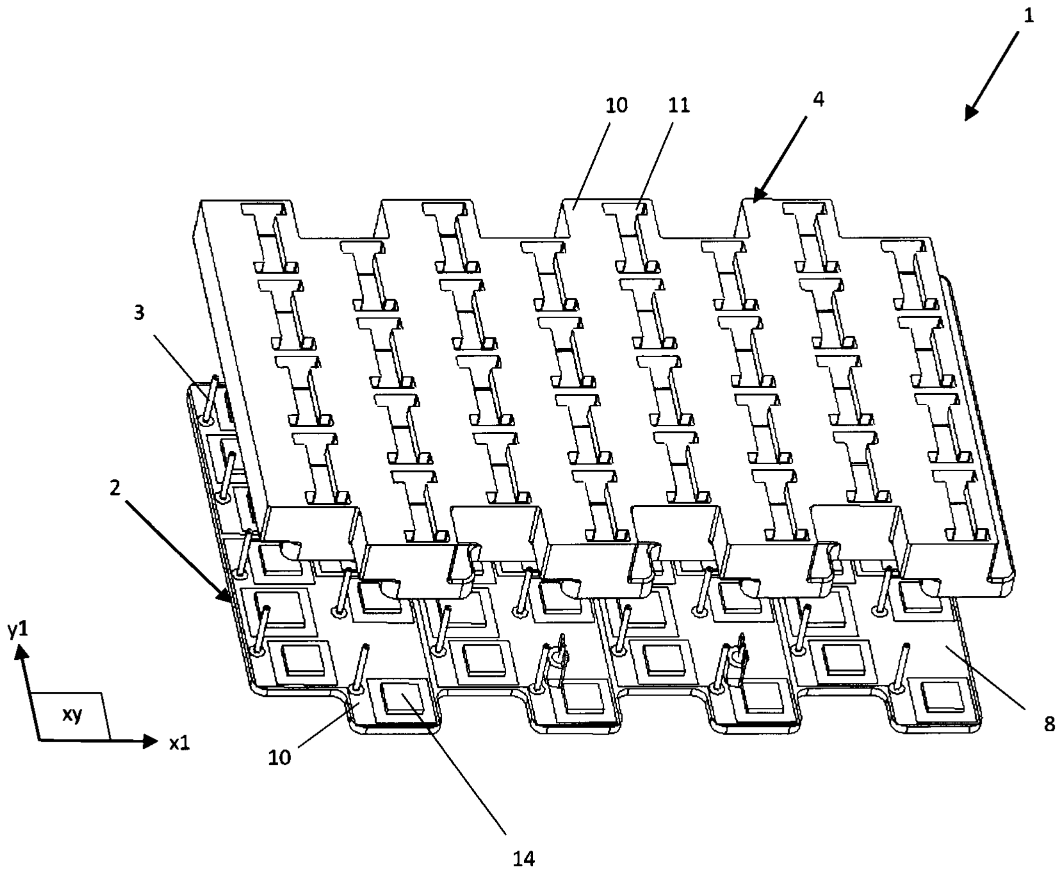
FIG. 2 Depicts an isometric view of an exploded array antenna

FIG. 2 illustrates the array antenna from FIG. 1 from an opposite side such that the first side of the substrate 2 and the radiating side of the antenna element module 4 are shown, the array antenna 1 having slot antenna elements, which comprise H-shaped slots. As illustrated in FIG. 2, the antenna elements 11 may be distributed in a plurality of rows extending in the longitudinal direction y1. Each row of antenna elements 11 may be shifted/have an offset in the longitudinal direction y1 in relation to an adjacent row of antenna elements as illustrated in FIG. 2.

As illustrated in FIG. 2, the substrate 2 may further comprise at least one electrical component 14 on the first side, the electrical components 14 may be surface mounted components. Further, each surface mounted component may be enclosed by a corresponding one of said plurality of chambers 12 when the antenna element module 4 is mounted to the substrate 2. The surface mounted components/electrical components 14 may be for instance amplifiers, resistors, capacitors, or any other component. It should be noted that a chamber 12 can enclose a plurality of electrical components.

Figure 3:
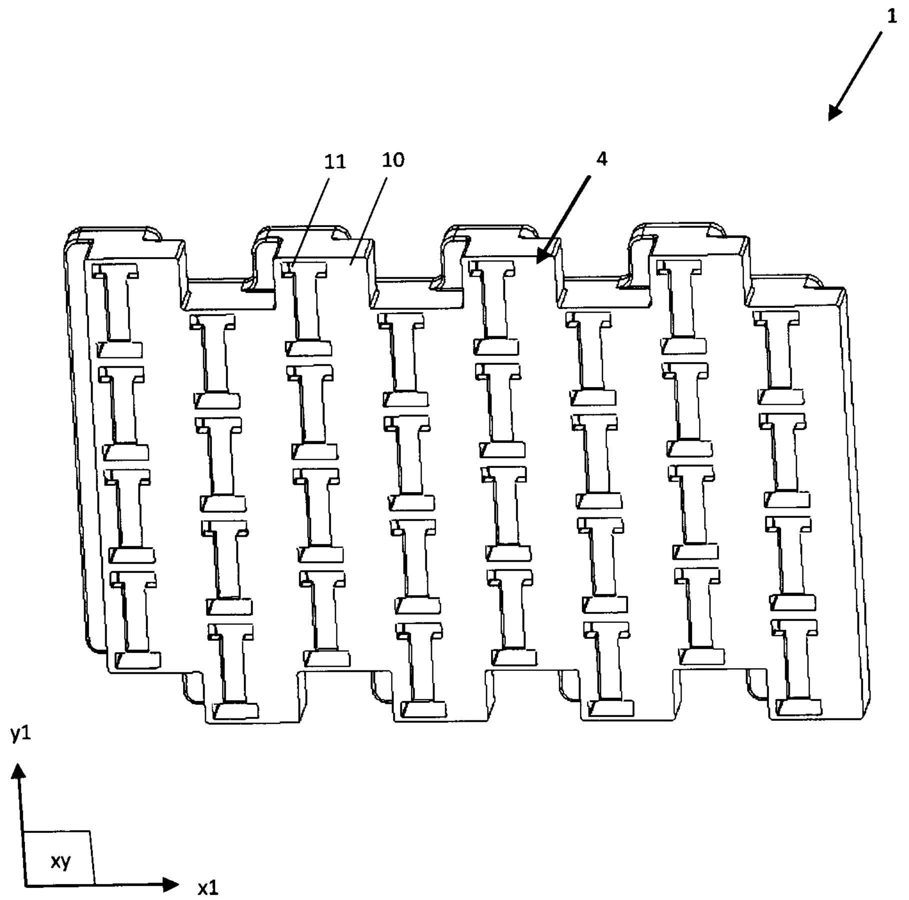
FIG. 3 Depicts an isometric view of an antenna element module viewed from the radiating side FIG. 4 Depicts an isometric view of an antenna element module viewed from the coupling side FIG. 5 Depicts an isometric view of an array antenna FIG. 6 Depicts a cross-sectional side view of an array antenna FIG. 7 Depicts schematically a method for manufacturing an array antenna FIG. 8A Depicts a vehicle comprising an array antenna FIG. 8B Depicts a base station comprising an array antenna

FIG. 3 illustrates an isometric view of an antenna element 4 module viewed from the radiating side. The antenna element module 4 comprises 8 rows of H-shaped slot antenna elements, wherein each row comprises 4 slot antenna elements.

Figure 4:
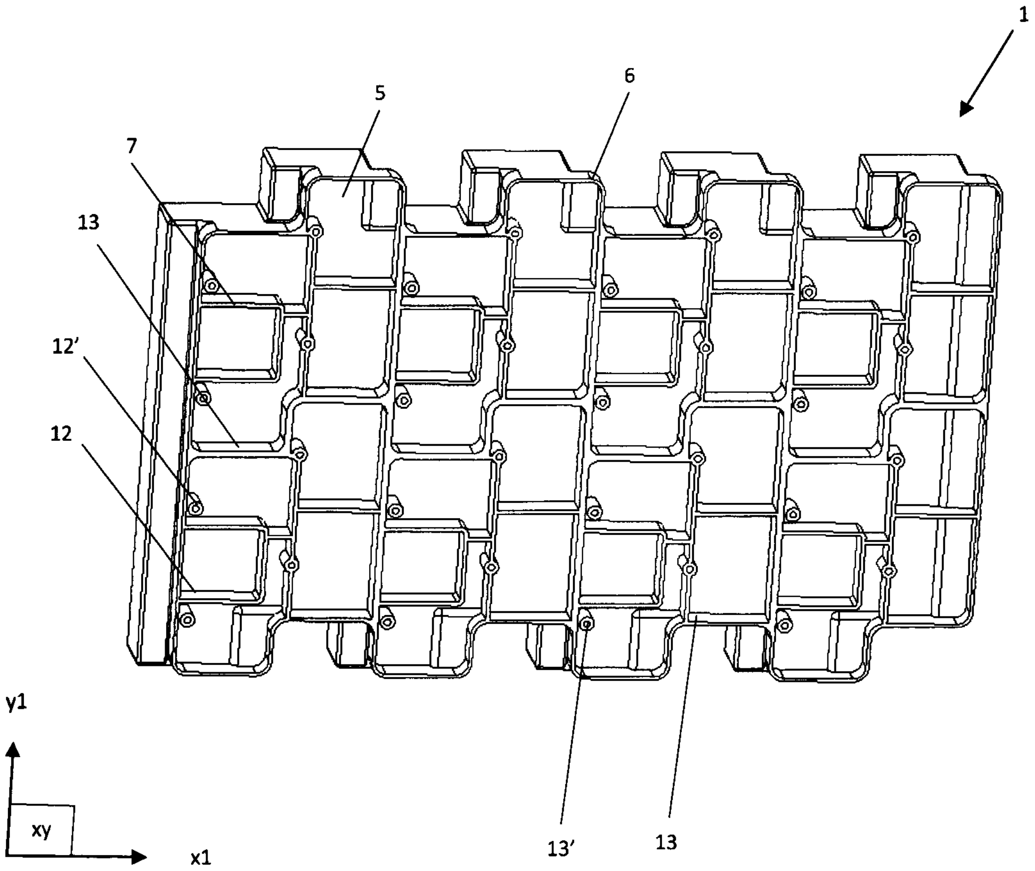

As illustrated in FIGS. 1 and 4, the electromagnetic shielding structure 6, extends from the coupling side 5 in a direction opposite to the third direction, wherein the electromagnetic shielding structure 6 comprises a plurality of chambers 12, each chamber 12 being defined by an inner shielding surface 13, enclosing each chamber 12. As illustrated in FIGS. 1 and 4 there may be a plurality of chambers 12 with differing shapes. In the FIGS. 1 and 4, the opposite side of at least one inner shielding surface 13 is another inner shielding surface 13. In other words, the electromagnetic shielding structures 6 in the antenna element module 4 are arranged so as to be optimally utilized in terms of space efficiency.

As illustrated in FIG. 4, the plurality of chambers 12 may comprises a polygonal form extending in a direction perpendicular to the first plane x1. The plurality of chambers 12 allow for shielding of electrical components 14, each of the plurality of chambers are enclosed by the coupling side 5 and the inner shielding surface 13 and have a polygonal shape.

As further seen in FIGS. 1 and 4, the electromagnetic shielding structure 6 comprises a plurality of connector enclosures 12' for EM shielding of the connectors 3, the connector enclosures 12' comprise a round shape extending in the third direction. The inner enclosure surface 13' of each connector enclosure 12' extends in the third direction through the coupling surface 5, forming a passage to the radiating section 15 (see e.g. FIG. 6). Thus, the connector enclosures 12' allow for a corresponding connector 3 to extend from the substrate 2 to the antenna element module 4 and feed the array antenna 1. In other words, the difference between the chambers 12 and the connector enclosures 12' is that chambers 12 are enclosed by the coupling side 5 and the inner shielding surface 13, and the connector enclosures 12' creates a passage through the coupling side 5. More specifically, the inner enclosure surface 13' of the connector enclosures 12' creates a passage through the coupling side 5 to the radiating section 12 (see e.g. FIG. 6). Thus the connector enclosures 12' are not enclosed by the coupling side 5 (see e.g. FIG. 6). The chambers and the connector enclosures 12, 12' may further have other suitable shapes.

The plurality of chambers 12 and the connector enclosures 12' allow for shielding of the electrical components 14 and connectors 3 arranged on the first side of the substrate 2.

Thus, the chambers 12 are arranged to shield the electrical components 14 and the connector enclosures 12' are arranged to shield a connector 3 and further allow the connector 3 to extend to the radiating section 15 for transmission of radio frequency signals to the same. Thus, the connector enclosures 12' fulfil an additional function compared to the chambers 12. The height of the radiating section 15 in the third direction is dependent on the frequency of the array antenna 1.

The array antenna 1 according to the present disclosure may also have electrical components 14 placed on the second side of the substrate 2.

FIGS. 1 and 4 illustrate that the electromagnetic shielding structure 6 forms a continuous structure. Thus, all of the plurality of chambers 12 and the plurality of connector enclosures 12' are connected, wherein all the plurality of chambers 12 share a common connecting portion 7 (see FIG. 4). Allowing for easier assembling of the antenna element module 4 to the substrate 2.

Figure 5:
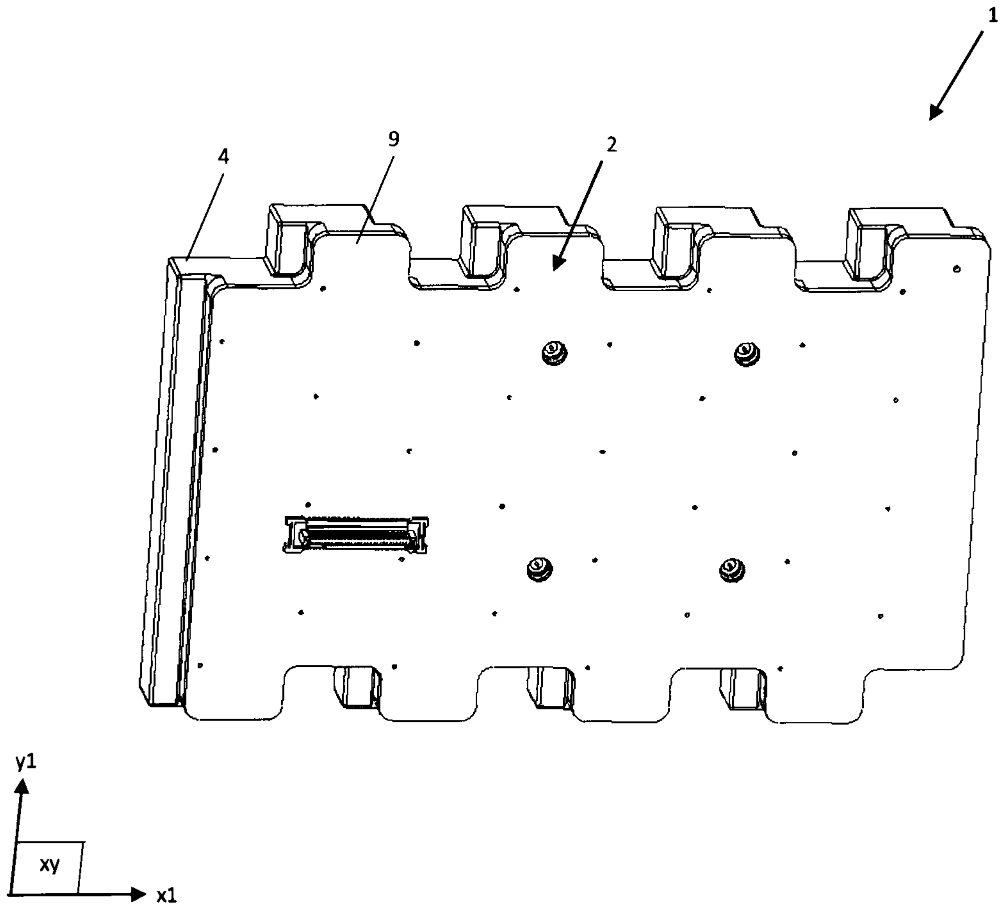

The connecting portion 7 of the electromagnetic shielding structure 6 may be joined to the first side 8 of the substrate 2 by means of adhesive, welding, soldering, mechanical fastening by screws or any other suitable method, FIG. 5 illustrate the antenna array when the electromagnetic shielding structure 6 is joined to the first side 8 of the substrate 2. An electrically conductive gasket may further be incorporated in the joined connecting portion 7 and electromagnetic shielding structure 6.

FIG. 5 illustrates the array antenna 1 from viewed from the second side 9 of the substrate 2. It should be noted that components may also be placed on the second side 9 of the substrate 2.

Figure 6:
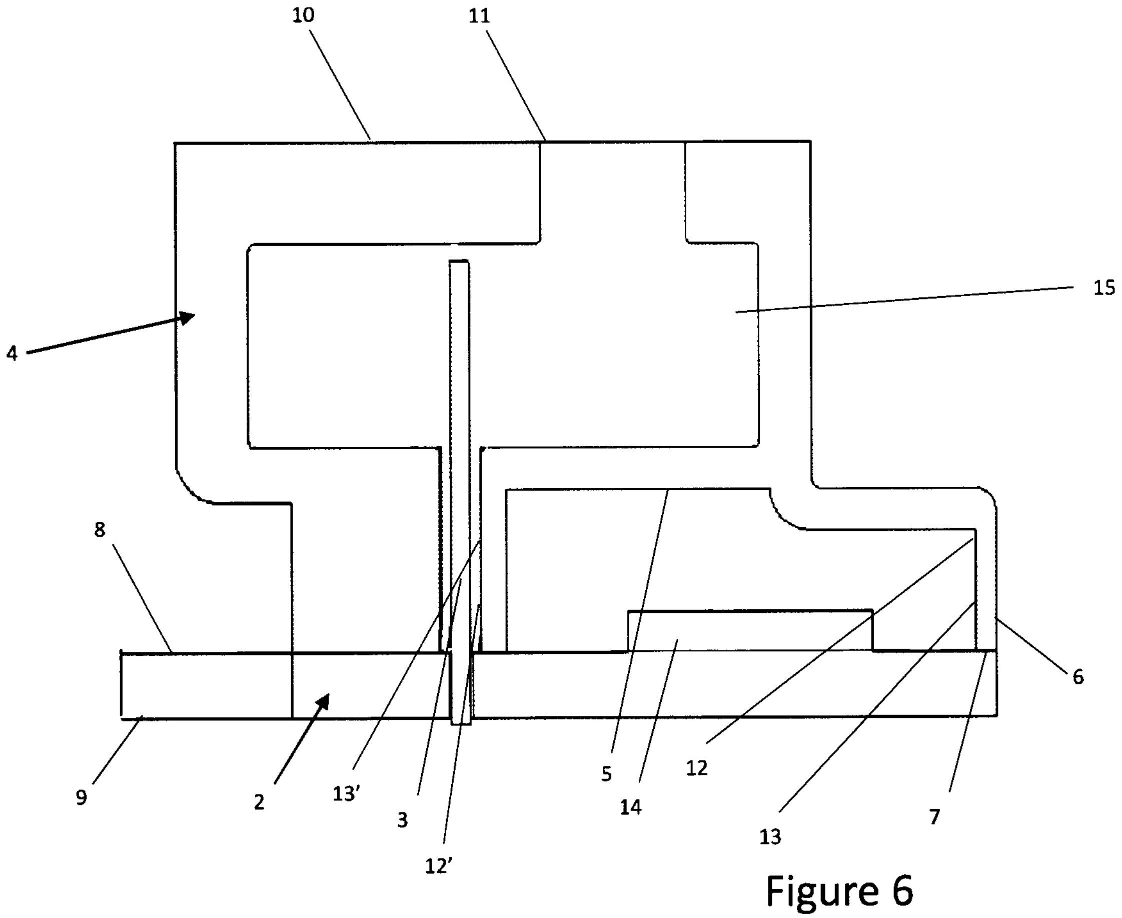

As illustrated in FIG. 6 showing a cross sectional side view of an assembled array antenna 1, each of the connectors 3 are galvanically isolated from the electromagnetic shielding structure 6 to prevent the connectors 3 to make electrical or direct contact with the electromagnetic shielding structure 6. Each of the connectors 3 may be surrounded by a non-conductive supporting layer in the area where the connectors 3 extend through the inner enclosure surface 13', so as to prevent the connectors 3 to tilt and thereby contact the electromagnetic shielding structure 6.

Generally, the figures illustrate antenna elements 11 that are slot antenna elements. However, according to some embodiments of the present disclosure the antenna elements 11 may be notch antenna elements, dipole antenna elements or any other suitable antenna element. The connector 3 may be arranged differently depending on the type of antenna element 11 that it is feeding. The connector 3 may be extending in the radiating section 15 without any galvanic connection to the antenna element as seen in FIG. 6, or the connector may be galvanically connected to the antenna element depending on the type of antenna element.

As further illustrated in FIG. 6, there may be a distance between the first side 8 of the substrate 2 and the coupling side 5 of the antenna element module 4 in the third direction. The electromagnetic shielding structure 6 extending from the antenna element module 4 creates the distance between the first side 8 of the substrate and the coupling side 5 of the antenna element module 4. The distance allow for components to have a thickness/height in the third direction.

Figure 7:
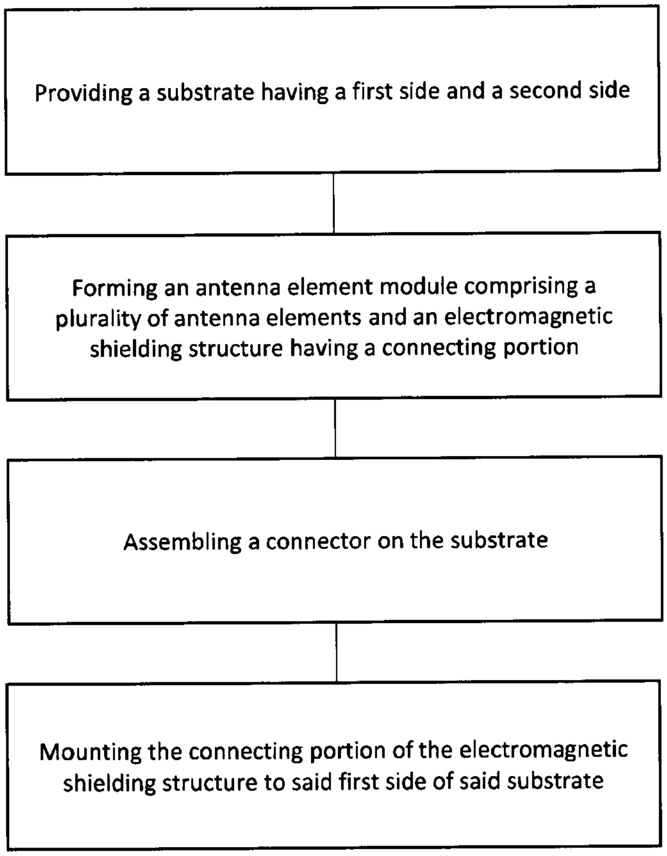

As schematically illustrated in FIG. 7, there is further provided a method for manufacturing an antenna array 1 extending along a first axis x extending in a first direction in a first plane xy and a second axis y1 extending in a second direction in the first plane xy, the method comprising; providing a substrate 2 having a first side 8 and a second side 9; forming an antenna element module 4 having a radiating side 10 and an opposing coupling side 5, the antenna element module 4 comprising a plurality of antenna elements 11, and an electromagnetic shielding structure 6 having a connecting portion 7, wherein the plurality of antenna elements 11 are arranged on the radiating side 10 and the electromagnetic shielding structure 6 arranged on the coupling side 5 of said antenna element module 4; assembling a connector 3 on said first side 8 of said substrate 2, said connector 3 extending in a third direction being perpendicular to the first plane xy; mounting the connecting portion 7 of the electromagnetic shielding structure 6 to said first side 8 of said substrate 2.

The method may further comprise the step of, preceding the step of mounting the connecting portion 7 of the electromagnetic shielding structure 6 to said first side 8 of said substrate 2; mounting at least one surface mounted component/electrical component 14 on the first side of said substrate 8.

The antenna element module 4 may be formed by additive manufacturing, moulding or milling.

Figure 8A:
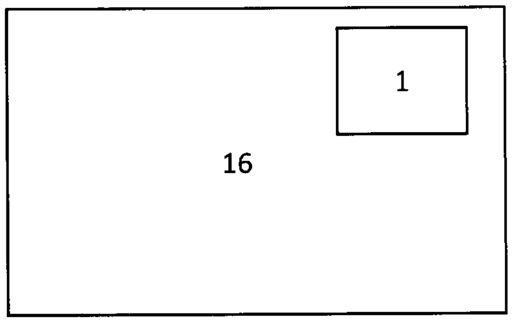
Figure 8B:
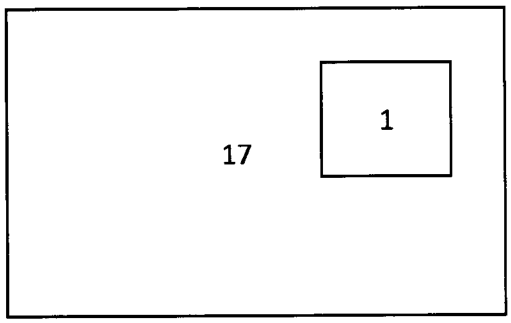

Further as illustrated in FIG. 8A, a vehicle 16 may comprise the antenna array 1 according to the present disclosure. The vehicle may be an aircraft, a vessel or a ground vehicle. Furthermore, as illustrated in FIG. 8B a base station 17 may comprise the antenna array 1 according to the present disclosure.

The invention claimed is:

1. An array antenna extending along a first axis in a first direction in a first plane, and a second axis in a second direction in the first plane, the first direction being perpendicular to the second direction, the array antenna comprising:

a substrate having a first side and an opposing second side, wherein the substrate further comprises at least one electrical component on the first side, wherein each electrical component is enclosed by a corresponding one of plurality of chambers, and wherein the at least one electrical component comprises at least one of amplifiers, resistors, and capacitors;

a plurality of connectors extending in a third direction from the first side, the third direction being perpendicular to the first plane; and an antenna element module having a radiating side and an opposing coupling side, wherein the antenna element module comprises a plurality of antenna elements arranged on the radiating side and an electromagnetic shielding structure arranged on the coupling side such that the electromagnetic shielding structure extends from the antenna element module and having an electrically connecting portion arranged to be mounted to the first side of the substrate, wherein the substrate is arranged to be coupled to the antenna element module such that the first side of the substrate faces the coupling side of the antenna element module and such that each connector is coupled to a corresponding antenna element of the plurality of antenna elements, and wherein the connecting portion of the electromagnetic shielding structure is joined to the first side of the substrate by at least one of adhesive, welding, soldering, electrically conductive gasket, and pressure methods.

2. The array antenna according to claim 1, wherein the electromagnetic shielding structure, extends from the coupling side in a direction opposite to the third direction, wherein the electromagnetic shielding structure comprises a plurality of chambers, each chamber being defined by an inner shielding surface enclosing each chamber.

3. The array antenna according to claim 2, wherein the plurality of chambers comprises a tubular and/or any polygonal form extending in a direction perpendicular to the first plane.

4. The array antenna according to claim 1, wherein the electromagnetic shielding structure further comprises a plurality of connector enclosures, each connector enclosure being defined by an inner enclosure surface, wherein the plurality of connector enclosures each extend in the third direction through the coupling surface, forming a passage to a radiating section.

5. The array antenna according to claim 4, wherein each connector is enclosed by a corresponding one of the plurality of connector enclosures.

6. The array antenna according to claim 4, wherein the plurality of connector enclosures comprises a tubular and/or polygonal form extending in a direction perpendicular to the first plane.

7. The array antenna according to claim 1, wherein at least a part of the electromagnetic shielding structure forms a continuous structure.

8. The array antenna according to claim 1, wherein each of the connectors are galvanically isolated from the electromagnetic shielding structure.

9. The array antenna according to claim 1, wherein the antenna elements are at least one of slot antenna elements, notch antenna elements, and dipole antenna elements.

10. The array antenna according to claim 1, wherein there is a distance between the first side of the substrate and the coupling side of the antenna element module in the third direction.

11. A vehicle comprising the array antenna according to claim 1.

12. A base station comprising the array antenna according to claim 1.

13. A method for manufacturing an array antenna extending along a first axis in a first direction in a first plane and a second axis in a second direction in the first plane, the method comprising:

providing a substrate having a first side and a second side;

forming an antenna element module having a radiating side and an opposing coupling side, the antenna element module comprising a plurality of antenna elements, and an electromagnetic shielding structure having a connecting portion, wherein the plurality of antenna elements are arranged on the radiating side and the electromagnetic shielding structure arranged on the coupling side of the antenna element module such that the electromagnetic shielding structure extends from the antenna element module;

assembling a connector on the first side of the substrate, the connector extending in a third direction being perpendicular to the first plane;

mounting at least one electrical component on the first side of the substrate, wherein the at least one electrical component comprises at least one of amplifiers, resistors, and capacitors, wherein the electromagnetic shielding structure comprises a plurality of chambers such that each electrical component is enclosed by a corresponding one of the plurality of chambers; and mounting the connecting portion of the electromagnetic shielding structure to the first side of the substrate by at least one of adhesive, welding, soldering, electrically conductive gasket and pressure methods.

14. The method according to claim 13, wherein the electromagnetic shielding structure comprises a plurality of connector enclosures, wherein the step of mounting the connecting portion of the electromagnetic shielding structure to the first side of the substrate is performed such that each connector is enclosed by a corresponding one of the plurality of connector enclosures.

15. The method according to claim 13, wherein the antenna element module is formed by additive manufacturing or milling.

* * * * *